(12) United States Patent
Atkinson et al.

(10) Patent No.: US 7,194,639 B2
(45) Date of Patent: Mar. 20, 2007

(54) POWER ADAPTER AND BROADBAND LINE EXTENDER SYSTEM AND METHOD

(75) Inventors: Douglas A. Atkinson, Ashburn, VA (US); Michael Giovannoni, Great Falls, VA (US)

(73) Assignee: Tellabs Vienna, Inc., Naperville, IL (US)

( * ) Notice: Subject to any disclaimer, the term of this patent is extended or adjusted under 35 U.S.C. 154(b) by 520 days.

(21) Appl. No.: 10/610,750

(22) Filed: Jun. 30, 2003

(65) Prior Publication Data

US 2004/0268160 A1    Dec. 30, 2004

(51) Int. Cl.
*G06F 1/00* (2006.01)
*H04B 10/12* (2006.01)

(52) U.S. Cl. .................... 713/300; 379/56.2
(58) Field of Classification Search ............. 713/300; 379/56.2
See application file for complete search history.

(56) References Cited

U.S. PATENT DOCUMENTS

| | | | |
|---|---|---|---|
| 5,530,748 A * | 6/1996 | Ohmori ...................... | 379/413 |
| 5,661,794 A | 8/1997 | Rosch et al. | |
| 5,838,989 A | 11/1998 | Hutchinson et al. | |
| 5,994,998 A * | 11/1999 | Fisher et al. ................ | 375/258 |
| 6,192,399 B1 | 2/2001 | Goodman | |
| 6,246,750 B1 * | 6/2001 | Ehreth ....................... | 379/56.2 |
| 6,253,249 B1 | 6/2001 | Belzile | |
| 6,320,866 B2 * | 11/2001 | Wolf et al. ................. | 370/420 |
| 6,449,136 B2 * | 9/2002 | Galecki et al. ............ | 361/93.9 |
| 6,516,352 B1 * | 2/2003 | Booth et al. ................ | 709/250 |
| 6,561,852 B2 * | 5/2003 | Lo .............................. | 439/638 |
| 6,563,418 B1 | 5/2003 | Moon | |
| 6,567,981 B1 | 5/2003 | Jeffrey | |
| 6,587,454 B1 * | 7/2003 | Lamb ......................... | 370/352 |
| 6,643,566 B1 * | 11/2003 | Lehr et al. .................. | 700/286 |
| 6,844,809 B2 * | 1/2005 | Manis et al. ................ | 370/465 |
| 2003/0061522 A1 * | 3/2003 | Ke et al. ..................... | 713/300 |
| 2003/0095539 A1 | 5/2003 | Feuer | |

FOREIGN PATENT DOCUMENTS

| WO | WO 01/52488 A1 | 7/2001 |
|---|---|---|
| WO | WO 02/102019 A2 | 12/2002 |
| WO | WO 03/005691 A1 | 1/2003 |

OTHER PUBLICATIONS

Roger Brown and David Iler, "Lighting up the neighborhood", CED Magazine, http://www.cedmagazine.com/index.asp?layout=article Print&articleID=CA6260975, Sep. 1, 1999.*

* cited by examiner

*Primary Examiner*—Thomas Lee
*Assistant Examiner*—Ji H. Bae
(74) *Attorney, Agent, or Firm*—Hamilton, Brook, Smith & Reynolds, P.C.

(57) ABSTRACT

A power adapter, in a presently preferred embodiment, includes a power converter and multiple data ports, and is configured for ease of coupling the power converter into pre-existing premises power connectors. Thus, premises power can be supplied from the power converter and a first data port, via data cabling, to a network terminating device for an external network. Multi-protocol adapters, such as an HPNA (Home Phoneline Network Alliance protocol compliant)/Ethernet adapter, may also be included to provide extension of a protocol (such as Ethernet) over pre-existing premises wiring. A back-up battery is optionally provided, as well as appropriate switches and indicators. Specialized male-female connectors may also be used.

18 Claims, 4 Drawing Sheets

POWER ADAPTER AND BROADBAND LINE EXTENDER SYSTEM AND METHOD

FIELD OF THE INVENTION

The invention in general relates to the field of communications, and more particularly to premises broadband communication systems.

BACKGROUND

One of the key challenges in the communications industry today is how to provide a cost effective, broadband solution for getting multiple services, such as telephony, video, and high speed data, to users in such diverse premises as homes and business buildings. The existing telephone service, sometimes known as plain old telephone service (POTS), even with advance solutions such as digital subscriber loop (DSL) technologies, may suffice for some telephony and data requirements, but is bandwidth constrained and inadequate for video provisioning. Cable television (CATV) systems do provide a broadband solution for delivering digital and video data, but the reliance on coaxial cable for the final distribution to homes and other premises remains a bandwidth limited solution. Thus, because of the superior bandwidth of fiber optic solutions, a variety of systems have been proposed to provide fiber to the home/business (FTTH/B) as the best overall solution for broadband services.

The leading FTTH/B solutions rely on passive optical networks (PONs), in which the optical network is terminated at the premises in some form of optical network terminator (ONTs). However, two key problems are present in today's solutions for coupling the optical networks, via the ONTs, to the local premises network. These existing solutions typically involve some form of customized cabling for linking the two networks. This happens because there are several different types of cabling found in premises today. A need also exists for a new power cable to be run to the ONT from the premises power supply. However, this approach is both cost prohibitive and time consuming. Not only does it drive up the installation time, but the power cabling may also require specialized installation services such as those of a registered electrician. Using different parts for different premises also drives up parts costs, and increases the risk of a mistake being made when configuring the equipment during the installation process.

Thus, there remains a need for a more standardized, cost effective, and efficient solution for coupling broadband optical and local premises networks, and providing power to the network terminating devices. Just such a solution to these and other problems noted above, is made possible by my invention.

SUMMARY

An illustrative summary of the invention, with particular reference to the detailed embodiment described below, includes a power adapter, having a power converter and multiple data ports, being configured for ease of coupling the power converter into pre-existing premises power connectors. Thus, premises power can be supplied from the power converter and a first data port, via data cabling, to a network terminating device for an external network. Multi-protocol adapters, such as an HPNA (Home Phoneline Network Alliance protocol compliant)/Ethernet adapter, may also be included to provide extension of a protocol (such as Ethernet) over pre-existing premises wiring. A back-up battery is optionally provided, as well as appropriate switches and indicators. Specialized male-female connectors may also be used.

THE FIGURES

My invention may be more readily appreciated from the following detailed description, when read in conjunction with the accompanying drawings, in which.

DETAILED DESCRIPTION OF AN EMBODIMENT OF THE INVENTION

A presently preferred embodiment according to our invention includes a universal power adapter and broadband line extender (for convenience, referred to as an UPAX). The UPAX provides a convenient solution for powering network termination devices by coupling premises network services with an external network. This preferred solution can be packaged in a single module for ease and speed of installation, yet it is easily configured to handle different types of premises wiring so as to provide a near-universal solution. This unique approach of the UPAX enables a cost effective and rapid deployment of FTTH/B solutions, while minimizing the risk of configuration mistakes during installation.

Figure 1:
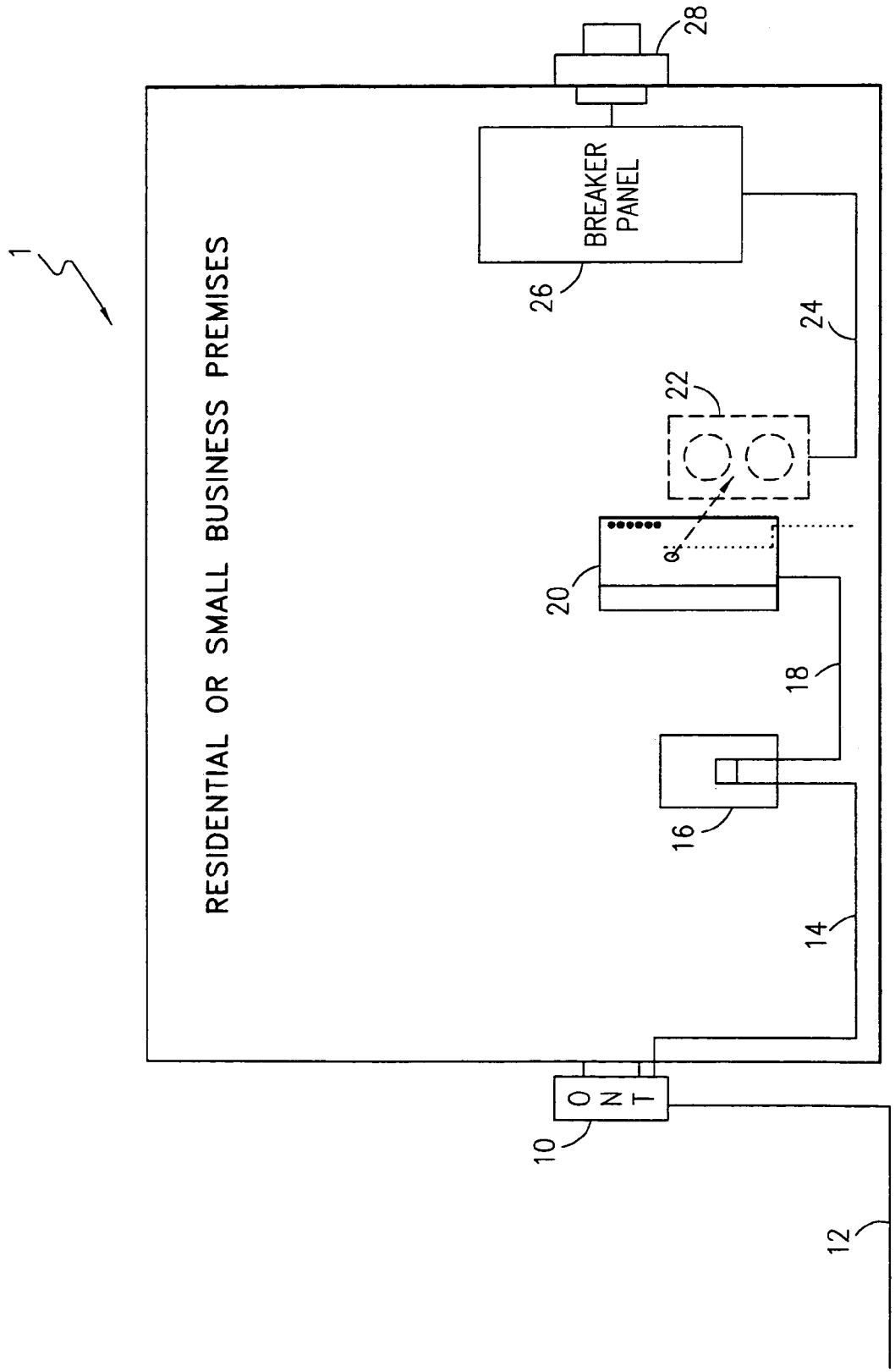
FIG. 1 is a general schematic of a system illustrating placement and installation of a power adapter within a premises according to a first embodiment of the invention.

This preferred embodiment of the invention may be better understood by considering first the illustrative diagram of the premises, shown in FIG. 1. Premises 1 may be any type of residential dwelling or business building or group of buildings, in which a local network solution is implemented and needs to be coupled to an external network. In the illustrated case the external network is an optical distribution network such as a passive optical network (PON) implementing a fiber to the home/building (FTTH/B) architecture. The fiber optic PON is terminated in a terminating device such as an optical network terminator (ONT) 10, which is typically installed externally to, or just inside, the premises. Because the fiber optic PON does not distribute power to its terminating devices ONT 10, ONT 10 must be powered from the local premises. While other non-optical networking solutions such as high-speed CATV data/video networks can supply power through their cabling, one skilled in the art will appreciate that the UPAX discussed herein may also be used in these architectures where the external network is unable to provide sufficient power for the operation of an external network terminating device.

In the preferred embodiment, optical line 12 is coupled via an RJ-45 port to Ethernet line 14 in the premises via ONT 10, although other cabling (such as a CAT 3 phone line) could be readily used. For purposes of coupling the ONT 10 an ethernet line 14 is presently preferred in FSAN (Full-Service Access Network) compliant PON ONTs, in part due to the broad implementation of Ethernet solutions for broadband networking. Established protocols also exist for delivering Power over Ethernet (PoE), although a skilled artisan will appreciate that other forms of wiring and protocols may be readily implemented for alternative premises networking solutions.

The UPAX 20 receives its power from the local premises. In the illustrated case, it is conveniently adapted to plug into a standard wall outlet 22, which is in turn connected via wiring 24 to the premises power distribution box (breaker panel 26). These are in turn connected to the Mains power distribution grid via power meter 28 at the premises boundary. In a typical residential dwelling, outlet 22 will be a standard 15A (amp) power outlet, providing 120 V AC. Where different power and/or plug configurations are present, such as in industrial applications or outside the United States, the UPAX 20 can be readily adapted so that it interfaces with the power outlets found in any given premise.

In some implementations, UPAX 20 may be coupled via convenient pre-existing data jacks 16 to ONT 10, using cables 14 and 18. Cables 14 and 18, as well as the additional premises network cabling, will typically include voice grade category (CAT 3) or data (CAT 5 or CAT 6) cabling.

Figure 2:
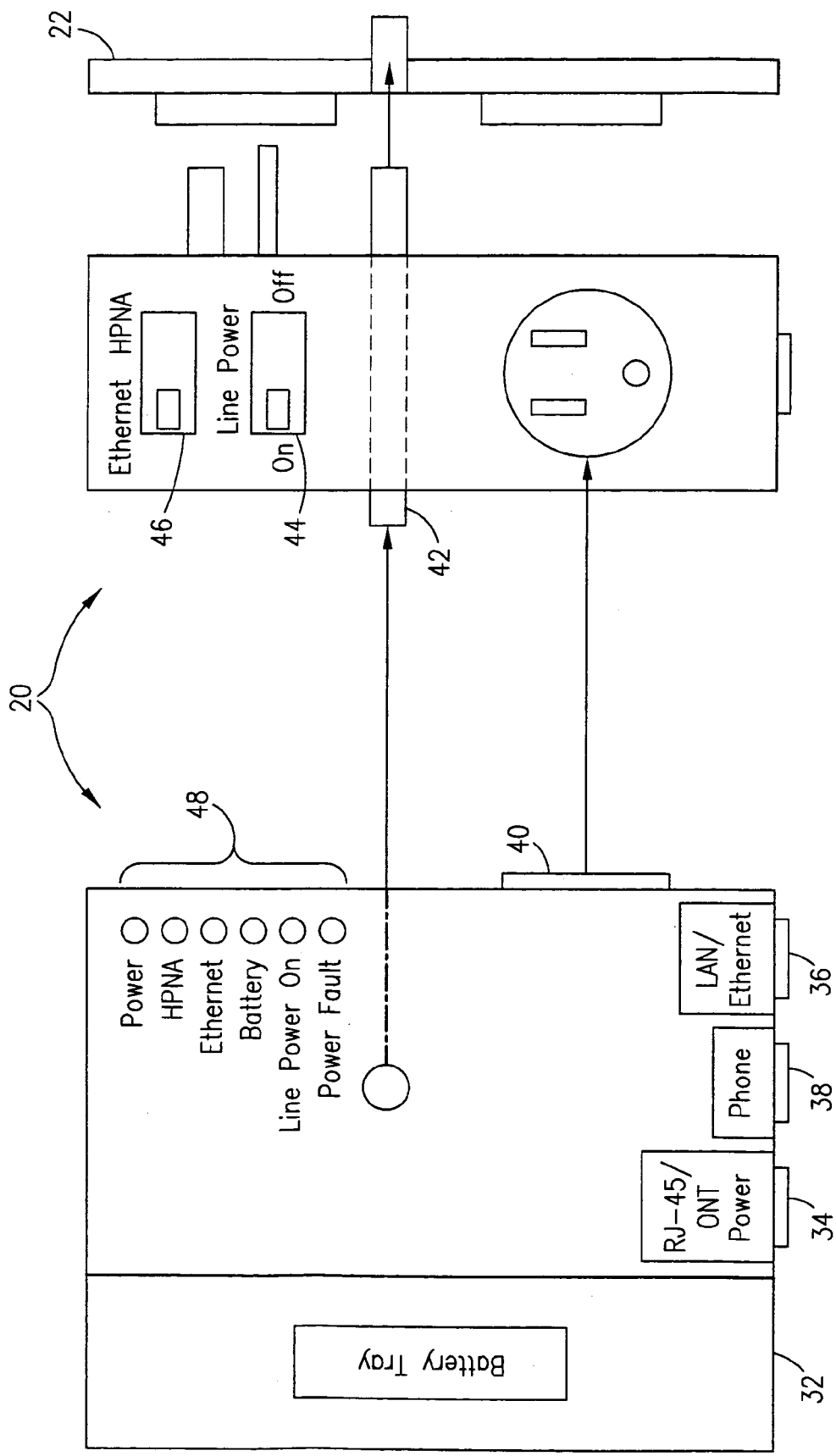
FIGS. 2A–2B are front and side perspective views, respectively, further illustrating the power adapter of FIG. 1.

Turning now to FIGS. 2A and 2B, respectively, a front and side elevational view of UPAX 20 is further illustrated. In the preferred configuration two RJ-45 female ports 34, 36 are provided, connecting the UPAX 20 to the ONT 10 and to the LAN/Ethernet premises network, respectively. An RJ-11 phone port 38 is also included. The UPAX 20 is configured to plug into the standard outlet 22 and secured via a screw to the standard screw hole in outlet 22. Because the UPAX 20 may cover outlet 22, an optional outlet 40 may also be provided to supply standard power to other electrical devices that might otherwise have been connected to outlet 22.

Two configuration switches are also conveniently provided. Line power switch 44 is, in the preferred implementation, a three position switch. In position 1, it controls the power converter (52 of FIG. 3) to convert the standard premises power (120 V AC) to the appropriate power for the ONT 20. In position 2, no power is provided to the line. This may be used, for example, in MDU (multiple dwelling unit) deployments where HPNA service is required. In position 3, proprietary power solution may be used (e.g., powering pins 7/8 with –48 V DC/GND at 0.3A maximum and 14W, at 12 V DC, or other appropriate characteristic/value). A GFI breaker may also be optionally used. A further selection switch 46 is used to provide power when a first position (in Ethernet) is selected, and remove power when UPAX 20 is connected to an HPNA network.

UPAX 20 also includes a back-up battery tray 32 and indicator lights 48. As noted above, the back-up battery can be used to provide telephony lifeline support power and other emergency power in the event of an outage to the premises power supply. Indicators 48 conveniently provide status and/or power information to a user, and may be LEDs or any other convenient device for presenting such information to a user.

Figure 3:
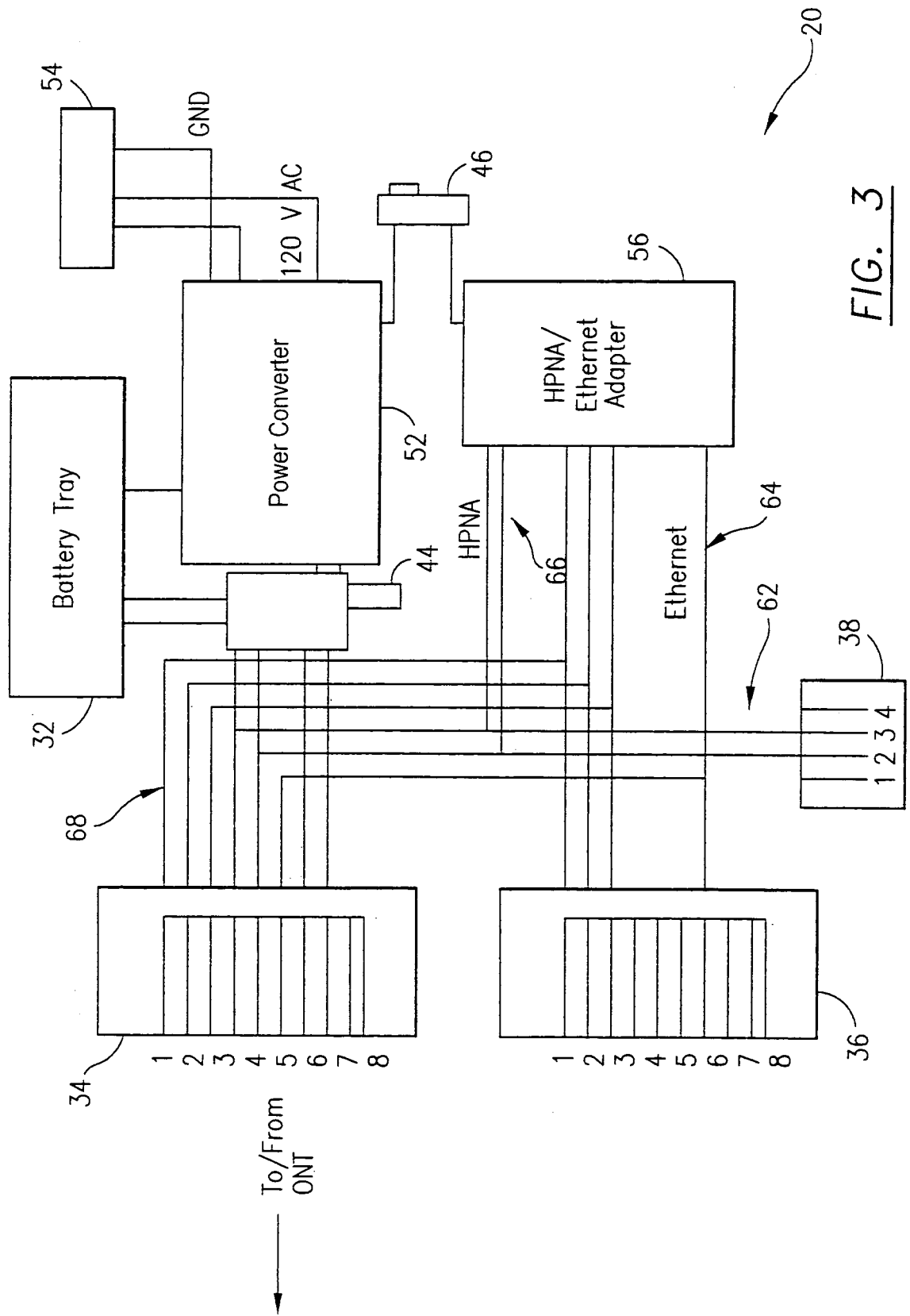
FIG. 3 is a block diagram further illustrating components of the adapter of FIG. 2.

FIG. 3 illustrates a block diagram of the internal components of UPAX 20. Ports 34 and 36 are 8-pin female RJ-45 ports, and port 38 is a female 4-pin RJ-11 jack. In the preferred embodiment, pins 4, 5, 7, and 8 of port 34 are coupled via power switch 44 to a power adapter 52. The power adapter can selectively supply 48V DC at 0.3A, 24V DC at 1A power, 12V DC or other appropriate power, via RJ-45 socket 34 to the ONT 10. As noted above, this could be in the form of an industry standard power such as PoE (e.g., conforming to IEEE Standard 802.3af Standard), or a proprietary power solution for the ONT 10. In the illustrated case, power adapter 52 receives its power (120V AC) via plug 54, adapted to fit into standard outlet 22. Battery tray 32 is also coupled to power selector switch 44 and power adapter 52, to provide an emergency power in the event of a premises power outage.

Because the premises may include several different types of cabling, at least two ports for use with coupling to the premises network are provided, in this case RJ-45 port 36 and RJ-11 port 38. These ports are both coupled to an HPNA/Ethernet adapter 56 via lines 62, 64 and 66, and the HPNA/Ethernet adapter 56 is in turn coupled to the power adapter 52 via selector switch 46 so as to be enabled when the alternative network (e.g. HPNA compliant) is desired. Selector switch 46 can be used to ensure that power is appropriately enabled in the case of MDU deployments where HPNA service is required. The illustrated configuration inherently supports line extension functions for Ethernet over HPNA 2.0 and similar specifications. This is used, for example, where the premises subscriber desires Ethernet service, but the local premises cabling does not include CAT 5 or 6 cabling. In this case, the adapter appropriately connects the data to the correct lines for use in a CAT 3 premises cabling. On the other hand, should Ethernet cabling already exist in the premises, the HPNA function can be turned off (using switch 46) and Ethernet port 36 can be utilized on the adapter as the local Ethernet interface. By pairing the RJ-11 adapter with the power function in HPNA, a service provider can effectively locate an Ethernet interfaced inside the premises, while at the same time supplying power to the network adapter on the side of the house.

Finally, the UPAX 20 may conveniently provide additional features such as a periodic load test of the batteries 32 and activation of an audible tone when the batteries no longer support the minimum required power. The battery back-up 32 should be designed to provide an appropriate minimum amount of power—e.g., one hour of Ethernet interface support, while concurrently supporting differing minimum amounts of power, e.g., four hours, for POTs line support for up to four telephony lines. The battery tray 32 may be of any appropriate and convenient size according to the design requirements, such as a tray of standard off-the-shelf 9V batteries in an easily replaceable tray.

Figure 4:
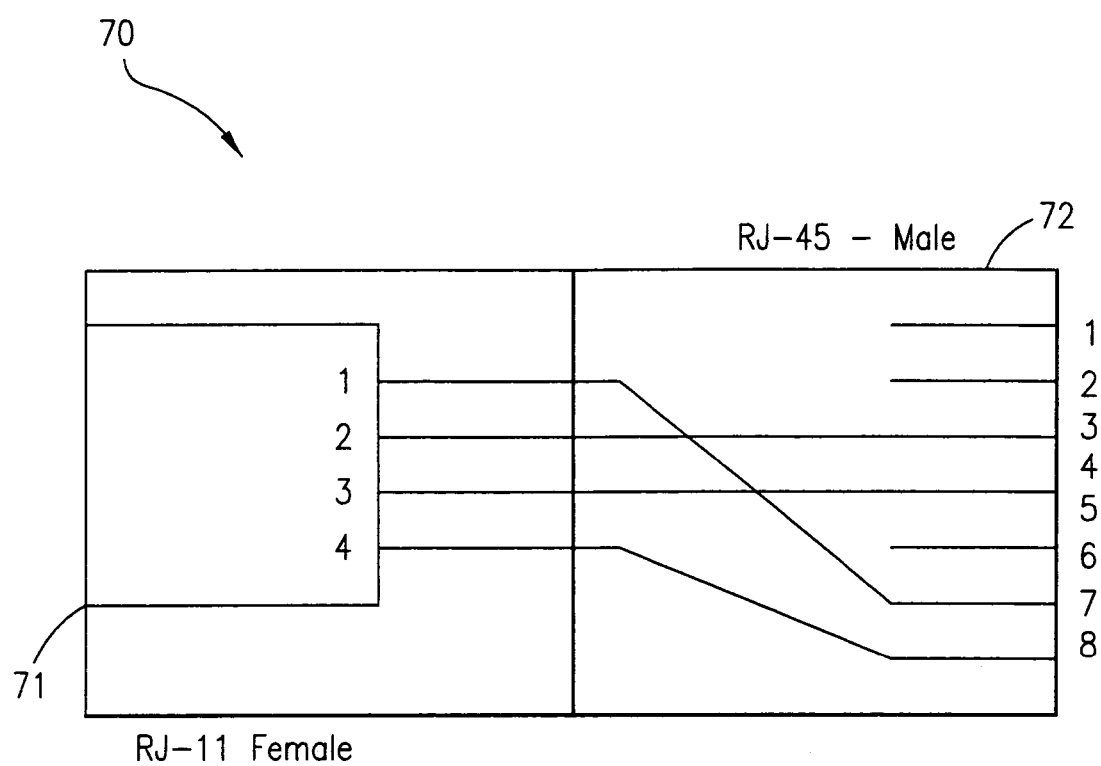
FIG. 4 illustrates a connector component for use in the system of FIG. 2

Turning now to FIG. 4, a safety adapter 20 is illustrated. This adapter is provided to ensure that the wrong pins are not energized in the event that premises cabling 18 coupling to RJ-45 port 34 is a CAT 3 cable. In this event, safety adapter 70 conveniently provides an RJ-11 female port 71 for receiving the CAT 3 cable and securely routing the four leads to the appropriate pins of male RJ-45 adapter 72. This ensures, for example, that access to the power on pins 7 and 8 is always correctly coupled via pins 1 and 4 on the RJ-11 CAT 32 cable connector. While this could alternately be performed in UPAX 20, if a switch is not set correctly the power could be applied to an Ethernet device such as ONT 10 on the wrong pins and damage the Ethernet device.

Those skilled in the art will appreciate that while certain specific embodiments have been discussed above, such as the use with specific RJ-45 and RJ-11 ports and an HPNA adapter, other components may be used with readily understood design trade-offs based upon specific premises network configurations. While the foregoing constitutes certain present, preferred and alternative embodiments of the invention, it is to be understood that the invention is not limited thereto, and that in light of the present disclosure various other embodiments should be apparent to persons skilled in the art. Thus, while the preferred embodiment is illustrated in connection with a PON ONT network termination, the invention may be used in connection with other types of network terminators needing premises-supplied power.

Accordingly, those skilled in the art will recognize that changes can be made without departing from the scope of the invention as particularly pointed out and distinctly claimed in the appended claims which should be construed to encompass all legal equivalents thereof.

The invention claimed is:

1. A power adapter for providing power to a broadband network termination device, the network termination device adapted to provide data services to a premises, the power adapter comprising:
   a power converter including a connector for connecting to a premises power source and converting the premises power to a power type usable by the network termination device, the network termination device for providing data services of an external network to the premises;
   a first data port, coupled to the power converter and adapted to provide power from the power converter to a cable, the cable used to provide power to and transfer data with the network termination device;
   a further data port adapted for coupling to a premises data network, wherein the further data port is coupled to the first data port so data can be transferred between the first data port and the further data port.

2. The power adapter of claim 1, further comprising a line power switch coupled between the power converter and first data port, adapted for controlling the type of power to the network terminating device.

3. The power adapter of claim 1, further comprising a temporary power supply coupled to the power converter.

4. The power adapter of claim 3, wherein the temporary power supply is a battery power supply coupled to both the power converter and a line power switch coupled between the power converter and first data port.

5. The power adapter of claim 1, wherein the further data port comprises second and third data ports of differing configuration, the power adapter further comprising a data adapter coupled to the first, second and third data ports and adapted for coupling data from the first data port to a selected one of the second and third data ports.

6. The power adapter of claim 5, wherein the first and second data ports are ethernet ports, and the third data port is a RJ-11 telephony port, and the data adapter is an ethernet/phoneline network adapter.

7. The power adapter of claim 6, further comprising a selector switch coupling the power converter with the ethernet/phoneline network adapter.

8. The power adapter of claim 1, further comprising indicator lights adapted for displaying status information about the power adapter, and an electrical outlet for supplying standard premises power to other devices.

9. The power adapter of claim 1, further comprising a multi-protocol connector having first and second mating elements, the first mating element adapted for connecting to connector pins of the first data port and coupling power from one or more of the connector pins of the first data port to one or more of the connector pins of the second mating element, the second mating element having a different pin configuration than the connector pins of the first data port.

10. The power adapter of claim 1, wherein the network termination device is an optical network terminator, the first data port is a first RJ-45 port, and the further data port comprises a second RJ-45 port and an RJ-11 port.

11. A method for coupling broadband data networks, comprising:
   a. coupling a multi-protocol power adapter to a premises power source, the power adapter comprising a power converter operable for converting power from the premises power source to a power type usable by a network termination device for providing data services of an external network to the premises, a first data port operably coupled to the power converter, and one or more further data ports operably coupled to the first data port to transfer data with a premises broadband data network;
   b. coupling the network termination device to the first data port of the multi-protocol power adapter via a first cable, the first cable providing power to, and data to and from, the network termination device; and
   c. coupling the one or more further data ports to the premises broadband data network,
   whereby data is communicated between the network termination device and premises broadband data network via the power adapter, and power is transmitted to the network termination device from the power adapter via the coupling means between the network termination device and the first data port of the multi-protocol power adapter.

12. The method of claim 11, step a. further comprising securely attaching the power adapter to a fixed power outlet.

13. The method of claim 12, wherein the further data ports comprise a second data port and a third data port operable to connect with different cable types, the method further comprising setting plural selection switches which are part of the power adapter to operably determine characteristics of the power type supplied to the network termination device and which of the second and third data port is operably coupled to the first data port.

14. A broadband network coupling system comprising:
   a network terminating device, operably coupled between an external data network and a premises data network, the external data network providing data services to the premises; and
   a power adapter operably coupled to the network terminating device, and adapted for providing power to the network terminating device, and for transmitting data to and receiving data from the network terminating device, comprising:
   a power converter operable to convert premises power to a form usable by the network terminating device;
   a first data port, coupled to the power converter and operable to provide power to the network terminating device, and to transmit data to or receive data from the network termination device, via data cabling;
   a line power switch coupled between the power converter and first data port, adapted for controlling the power to the network terminating device; and
   a further data port operably coupled to the premises data network, wherein the further data port is operably coupled to the first data port to transfer data between the first data port and the further data port, whereby data is transferred between the external data network and the premises data network, and the network terminating device is powered via the power adapter.

15. The system of claim 14, wherein the further data port comprises second and third data ports of differing configuration, the power adapter further comprising a data adapter coupled to the first, second and third data ports and adapted for coupling data from the first data port to a selected one of the second and third data ports.

16. The system of claim 15, wherein the network terminating device is an optical network terminator coupled to an external optical network, the first and second data ports are ethernet ports, and the third data port is a telephony line port, and the data adapter is an ethernet/phoneline network adapter, the system further comprising a selector switch coupling the power converter with the ethernet/phoneline network adapter.

17. The system of claim 16, further comprising a battery power supply coupled to both the power converter and a line power switch coupled between the power converter and first data port, operable to provide temporary power to the optical network terminator and one or more in-premises phones coupled to the power adapter, the system further comprising indicator lights adapted for displaying status information about the power adapter, and an electrical outlet for supplying standard premises power to other devices.

18. The system of claim 17, further comprising a multi-protocol connector having first and second mating elements, the first mating element adapted for connecting to connector pins of the first data port and coupling power from one or more of the connector pins of the first data port to one or more of the connector pins of the second mating element, the second mating element having a different pin configuration than the connector pins of the first data port.

* * * * *